Figure 1:
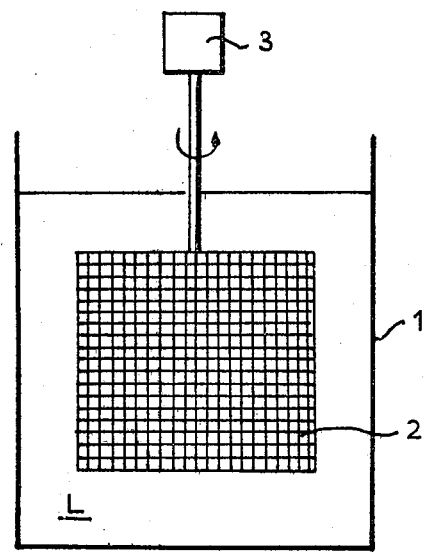

United States Patent [19]

Salmon

[11] 4,423,081
[45] Dec. 27, 1983

[54] ACIDULATION OF MILK

[75] Inventor: Michel Salmon, Sancerques, France

[73] Assignee: Laiteries Hubert Triballat, France

[21] Appl. No.: 207,927

[22] Filed: Nov. 18, 1980

Related U.S. Application Data

[63] Continuation of Ser. No. 16,093, Feb. 28, 1979, abandoned.

[30] Foreign Application Priority Data

Mar. 2, 1978 [FR] France .................. 78 06006

[51] Int. Cl.$^3$ .............................................. A23C 9/146
[52] U.S. Cl. .................... 426/271; 210/681; 426/491; 426/580
[58] Field of Search ............... 426/271, 580, 583, 491, 426/495; 210/681, 682, 687

[56] References Cited

U.S. PATENT DOCUMENTS

| | | | |
|---|---|---|---|
| 2,477,558 | 8/1949 | Almy et al. | 127/31 |
| 2,503,866 | 4/1950 | Chrysler et al. | 426/271 |
| 2,707,152 | 4/1955 | Chaney et al. | 426/271 |
| 2,708,633 | 5/1955 | Stimpson et al. | 426/271 |
| 2,793,953 | 5/1957 | Loo | 426/271 |
| 2,879,166 | 3/1959 | Wilcox | 426/271 |
| 3,020,161 | 2/1962 | Murthy et al. | 426/271 X |
| 3,615,664 | 10/1971 | Francis | 204/180 P |

FOREIGN PATENT DOCUMENTS 2177562 11/1973 France .
2331963 6/1977 France .
2390106 12/1978 France .

OTHER PUBLICATIONS

Colmon et al., *Ion Exchangers in Organic & Biochemistry*, 1957, p. 636.
Weisberg et al., "Whey For Foods & Feeds", *Food Technology*, vol. 23 (2–1969), pp. 186, 187, 189 & 190.
Glass et al., "Nutritional Composition of Sweet & Acid-Type Dry Whey", *Journal of Dairy Science*, vol. 60, No. 2 (1977), pp. 190–196.
Chemical Abstracts, vol. 60 (1964), 6135g.

*Primary Examiner*—Arthur L. Corbin
*Attorney, Agent, or Firm*—McGlew and Tuttle

[57] ABSTRACT

A process is described for the acidulation of milk which comprises a first acidulation stage in which the milk is contacted with a cationic exchange resin in its acid form until a pH value is obtained which is not less than that at which flocculation of the milk takes place, and a second stage in which acidulation is completed by the addition of an acid. The process is particularly useful in the production of casein.

Apparatus for use in the process is also described. In particular, apparatus is described in which the acidulated milk is subsequently coagulated in a coagulator and the whey produced is separated and used to regenerate spent resin from the acidulation stage.

4 Claims, 3 Drawing Figures

ACIDULATION OF MILK

This is a continuation application of the U.S. Ser. No. 16,093 filed Feb. 28, 1979, now abandoned.

The present invention relates to the treatment of milk and lactic substances. More particularly, the invention relates to processes for the acidulation of milk, to apparatus therefor and to the products resulting from these treatments.

On skimming whole milk, skimmed milk is obtained having a pH value between approximately 6.6 and 6.8. It is a mixture of an aqueous phase and a colloidal phase. The aqueous phase contains lactose, water-soluble vitamins, inorganic salts in solution and proteins of the whey. Protidic nitrogen, which represents approximately 95% of the total nitrogen, includes casein at approximately 78% by weight, whey proteins at approximately 16% by weight and 1% of minor proteins such as lactotransferrine, lactolline, the membranes of fatty corpuscles and enzymes. The whey proteins are especially the proteoses peptones (4 to 6%) which are thermostable and albumins and globulins which are thermolabile, such as B lactoglobulins (approximately 5 to 7%) and α-lactalbumins (approximately 1 to 3%); whey albumins (approximately 0.5% to 1.5%) and immunoglobulins (approximately 2 to 4%). Casein, whose average content in cow's milk is approximately 27 grams per liter, includes α-caseins (45%), especially l'$\alpha_{S1}$ casein, and K-caseins (15%), notably para-K casein (9%), and glycol peptides (3%), as well as B-casein and casein.

Whole casein is the protein complex precipitated from milk at pH 4.6. This complex is likewise known as isoelectric (or Hammarsten) casein. Casein has many uses, especially in the food industry and in the adhesives industry.

Casein is characterised by its process of preparation and lactic casein and hydrochloric casein are especially distinguished.

To prepare lactic casein, milk is made to ferment spontaneously. The acidity is brought to approximately 90° Dornic (10° Dornic corresponds to 1 ml of standard sodium hydroxide per gram). It has also been proposed to add to the milk acidulating microorganisms, such as Str. Cremoris, Str. Lactis, in order to achieve a pH value of 4.5 in 12 hours or so.

The serious advantage of lactic casein is the necessity to store large volumes for fermentation for prolonged periods.

To overcome this disadvantage, the violent action of hydrochloric acid has been proposed, the addition of which enables the pH value of skimmed milk to be lowered quickly to the point of flocculation of the casein. The curd formed is then washed to reduce its acidity, the lactose content and the content of mineral substances, so as to obtain a casein conforming to the following International Food Standards:
Proteins (dry): 95%
Mineral substances (dry), including P$_2$O$_5$: 2.5%
Fatty substances: 1.5%
Moisture: 10% maximum
Free acidity: 0.15% maximum
Sediment: B maximum The washed casein is subsequently pressed in a horizontal decanter to remove to the maximum degree the free water of the curd (dry extract of 45 to 50% by weight) and is brought to a dryer. To obtain effective drying, the pressed curd, which is in the form of a cake, must be granulated. Drying is generally effected in a fluidised bed dryer.

In the manufacture of an acid casein the pH value of the milk is lowered to its isoelectric point by the addition of a strong acid (hydrochloric, sulphuric, nitric, lactic, etc.). The concentration of H$^+$ ions of the milk is therefore increased, but the content of chlorides, sulphates, nitrtes or lactates is likewise increased.

Although the H$^+$ cations are necessary to the process of lowering the pH value, the anions are prejudicial and provide nothing but a considerable mineral load. These additional minerals are found in the final stage in the curd before washing and in milk whey.

If milk whey originating from the preparation of hydrochloric casein is to be used, it is indispensable to subject it to demineralisation in order to remove these excess minerals.

A hydrochloric casein milk whey contains 12 to 14% by weight of mineral substances in relation to the dry extract and approximately 7 to 8% by weight or more of chlorides.

Prior processes present two main disadvantages: on the one hand, violent treatment with a strong acid may denature or degrade certain valuable products contained in the skimmed milk to be treated and, on the other hand, these processes load the products of the treatment with useless or even harmful mineral substances which it is then necessary to eliminate, at least partially, by subsequent lengthy and expensive treatments.

The invention overcomes these disadvantages with careful acidulation of the skimmed milk without the addition of undesirable anions.

It has now been found that milk can be acidulated by bringing it into contact with a cationic exchange resin in the H$^+$ form. The resin exchanges its H$^+$ cations with the cations of the metals of the milk. There is therefore no addition of anions.

However, when this technique is adopted, difficulties arise. If no precaution is taken, the local pH value of the part of the skimmed milk which is in contact with a ball or a particle of cationic resin falls too quickly. This part coagulates immediately on the ball. For the purpose of industrial operation, therefore, it is appropriate, on the one hand, to take measures to carry out by means of the resin only the first stage of acidulation, for example, until a pH value is obtained which is not less than that at which flocculation of the skimmed milk takes place, for example, not less than 4.7, especially between 4.9 and 5.0, so as to prevent the resins from being trapped by the flocculated casein, and, on the other hand, to avoid prolonged contact between a ball of resin and the same part of the skimmed milk. Consequently, it is advisable to maintain the skimmed milk and cationic resin in relative movement during the time when they are brought in contact, especially by maintaining the resin in suspension in the skimmed milk by continuous stirring of the latter.

When this first stage has been carried out, the acidulated skimmed milk is separated from the resin balls and acidulation is completed, for example with dilute acid, e.g. dilute HCl, until a pH value of approximately 4.6 is obtained. Finally, in a conventional manner, the curd and whey are separated and the casein is washed, pressed and dried.

The first stage of acidulation according to the invention is effected by bringing the milk, especially skimmed milk, in contact with cationic resins in H+ form.

Conventional cation exchange resins can be used, e.g. those sold under the names Amberlite of Rohm and Haas, Duolite of Diamond Alkali Company, Kastel, Couvex (copolymers of styrene and divinylbenzene with functional exchange groups), Lewalite, Relite, Zerolit, etc.

In view of the mechanical stresses which the resins undergo, those of macroporous type, being more resistant, are preferred to those of the gel type (Lewatit S100 or Duolite C20).

It is appropriate for suspension that the density of the resin is in the neighbourhood of that of milk, for example, approximately 1.035. The size of the balls or pellets is preferably between approximately 0.5 and 1 mm. It is important that the size of the balls should be uniform to ensure homogeneous distribution of the balls in the skimmed milk and to prevent any local coagulation on a ball which is too heavy or too light to be displaced by stirring of the suspension. Too light a ball would remain on the surface of the suspension. Since it is necessary subsequently to separate the balls from the milk, it is preferable that the balls have sufficient size to be retained by a separating sieve.

The ratio of the weight of skimmed milk to the weight of the balls may vary widely according to the duration of treatment and stirring of the suspension. This ratio is the smaller, the shorter the duration and the less the stirring. In general, this ratio is between 1:6 and 1:20. For example, good results have been obtained with 80 to 100 ml of resins to 1 liter of milk, stirring for 3 to 5 minutes with a magnetic stirrer. If desired, stirring may be completed by a jet of air on the surface of the suspension, used intermittently to prevent foaming, especially in the case of a large capacity tank. In general, periods of 1 to 30 minutes are suitable.

Satisfactory results have been obtained by working between 4° and 50° C. Laboratory tests conducted at 4° C., 10° C., 20° C., 40° C., 50° C. and 70° C. have proved satisfactory. However, above 50° C. certain unstable products may be denatured, while it is rare to have milk at a temperature below 4° C.

The invention concerns apparatus for carrying out the process, which comprises a container to receive the milk and the cationic resin, means to maintain the milk and cationic resin in relative movement in the container, a pH meter, and means controlled by the pH meter to remove selectively the milk or the resin when the pH of the milk reaches a given value.

The above-mentioned selective removal means is preferably a basket for the resin, the mesh aperture size of the basket being smaller than the resin, together with means for taking the basket out of the container.

In conventional acid casein processing the whey obtained is very strongly acid and mineralised.

A hydrochloric casein whey contains 12 to 14% of mineral substances, 7 to 8% of which is chlorides calculated as sodium chloride. The acidity is between 50° and 60° Dornic.

The process of acidulation of milk with resins enables a whey to be obtained having a much smaller mineral content of 7 to 8% (including 3 to 4% of chlorides). This whey is also partly decationised. Sodium, potassium and calcium participate in part in the exchange reaction with the H+ ions of the resin.

The milk whey according to the invention has a mineral substance content of less than 10% by weight, preferably less than 8%, and a ash alkalinity level of less than 750, preferably less than 500, expressed as mg $Na_2CO_3$ per gram of ash.

The casein obtained is itself also novel. It is of excellent quality, of a more aerated and firmer structure and is also whiter, has not undergone a violent addition of acid and possesses interesting properties.

The milk whey obtained by bringing the skimmed milk in contact with a cationic resin differs from a conventional milk whey of hydrochloric casein, mainly in having a lower total content of mineral substances of 8 to 9% instead of 11 to 14% and a much lower chloride content (estimated as NaCl), namely, less than 3.5% instead of 6 to 8%, and lower sodium, potassium and calcium contents.

Thus the invention provides in particular a milk whey having a mineral substance content of less than 9% by weight and by a weight of chloride content estimated as NaCl, of less than 3.5% by weight.

The proportions by weight of sodium and potassium are less than 1.0% and 3% respectively and that of calcium is between 1.5 and 2%. Although these three last ranges overlap those of a hydrochloric milk whey, the amounts are low, so that the amount by weight of the sodium, potassium and calcium together is less than 5%, which is not the case with a hydrochloric milk whey.

Set out below for the purpose of comparison are results of analyses conducted on several wheys originating from processes for the hydrochloric preparation of casein and for the preparation of casein by acidulation with a cationic resin. The ranges shown correspond to variations in the composition of the starting milk according to the particular animals, the region and the season.

1. Composition of a conventional hydrochloric casein milk whey
  Acidity: 40° to 50° Dornic
  pH value: 4 to 4.4
  mineral substances (% dry weight): 11 to 14%
  alkalinity of ashes: <300 mg $Na_2CO_3$
  chlorides (estimated as NaCl): 6 to 8%
  sodium: 0.7 to 1.2%
  potassium: 2.4 to 3%
  calcium: 1.7 to 2.2%.

2. Composition of a casein milk whey according to the invention
  Acidity: <40°0 Dornic
  pH value: 4.2 to 4.4
  mineral substances: 8 to 9%
  alkalinity of ashes: <300 mg $Na_2CO_3$
  chlorides (as NACl): 3.5%
  sodium: 1.0%
  potassium: 3.0%
  calcium: 2.5 to 2%.

For a milk having a given saline composition, acidification with resins enables a milk whey to be obtained having:
  a much lower total content of mineral substances;
  a lower acidity;
  a much lower content of chlorides;
  a lower content of sodium, potassium and calcium, since during the exchange of H+ ions for acidification the milk loses sodium, potassion and calcium which become fixed to the resin.

The invention also provides a process for the preparation of casin from skimmed milk, which comprises bringing the skimmed milk into contact, while stirring, with a cationic resin in H+ form for a sufficient period to provide milk having a pH of above 4.7but below the initial pH value and resin containing metal ions, separating the resulting milk from the spent resin, coagulating the separated milk to obtain curd and whey, separating the curd and whey, and regenerating the spent resin with the separated whey.

The whey is preferably concentrated before it is used for regeneration. Concentrated whey may also be used to finish coagulation or flocculation instead of the acid conventionally used.

It will be understood that all these measures make it possible to reduce the quantity of hydrochloric acid which is used and to make considerable savings on operating costs. Investment expenditure is reduced to a minimum, since it is limited to pipework and, if desired, to an evaporator-concentrator.

The first stage of the process of preparation of casein according to the invention comprises bringing skimmed milk in contact, while stirring, with a cationic resin in $H^{30}$ form for a period enabling milk to be obtained with a pH value above 4.7, but below the pH value of the starting milk, as described above.

The second stage of the process according to the invention comprises separating the milk obtained, whose pH value has therefore been lowered but still remains above the flocculation point, from the resin containing the metal ions. This separation may be effected very simply on an inclined sieve, such that the resins slide down the inclined face of the sieve and are picked up by a conveyor for delivery to a resin regenerating tank, while the acidulated milk is collected by a pump and is usually delivered by intermediate storage before being heated, degassed and coagulated in a coagulation tube where the third stage of the process according to the invention is carried out.

The fourth stage of the process according to the invention comprises separating the curd or solid substance formed during coagulation of the liquid whey. Where, again, an inclined sieve may be used, enabling the curd to be dropped into a curd-diluting vat.

The curd then passes to a washing tower, a decanter and a conventional casein processing dryer. The whey, if necessary after evaporation, is returned to the tank where the resin to be regenerated is situated, thus utilising the residual acidity of the whey for useful purposes. If desired, this acidity of the whey may also be used to replace wholly or partly the acid necessary for completion of coagulation in the coagulation tube.

The invention also provides apparatus for the preparation of casein which comprises a container equipped with an agitator for acidulation of skimmed milk with a cationic exchange resin; a sieve for separating the acidulated milk from the spent resin taken from the container; a tube for coagulating the acidulated milk; a separator, positioned downstream of the tube, for separating the curd and serum formed in the coagulation tube; two tanks for storing and regenerating said resin arranged in parallel and arranged to communicate alternately with the said container; means for conveying spent resin from the sieve to said tanks; and means for taking whey from the separator alternately to one and the other of said tanks.

In the attached drawings given purely by way of example

Figure 2:
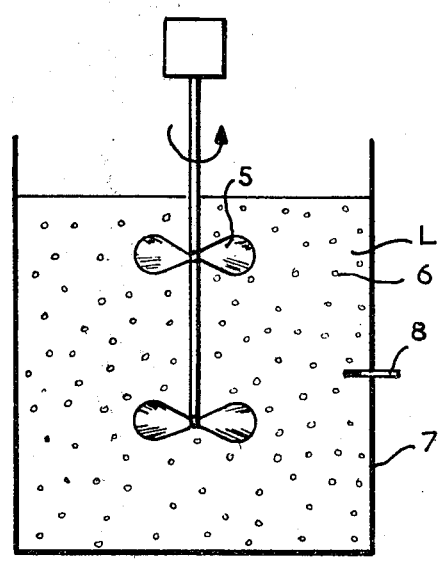
Figure 3:
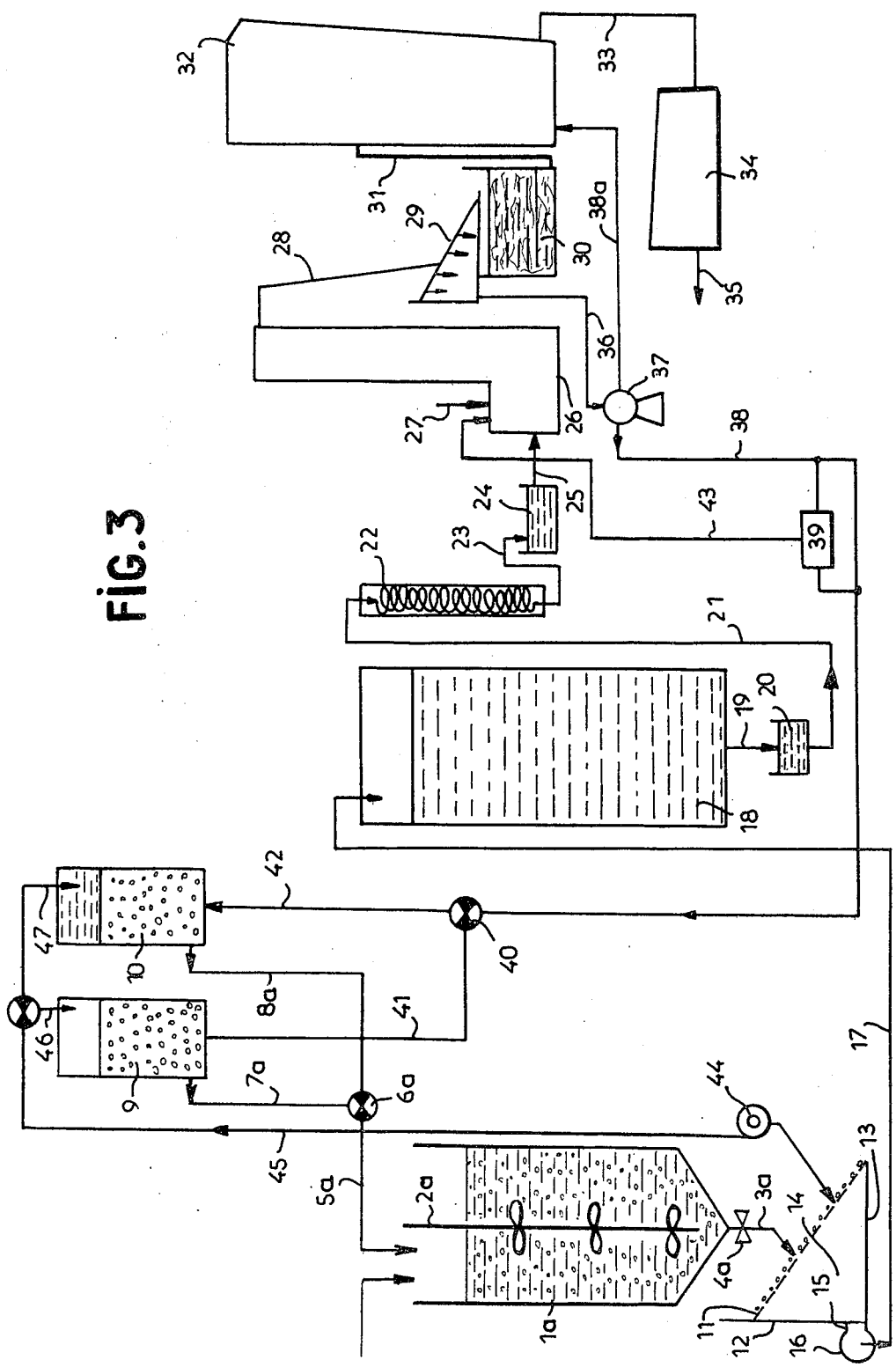

FIGS. 1 and 2 are diagrams of two installations for performing the process according to the invention and FIG. 3 is a diagram of a casein processing plant.

In FIG. 1 skimmed milk L is placed in a container 1. A basket 2 filled with resin balls having dimensions larger than the mesh aperture of the basket is agitated in the container 1. When a pH meter shows a certain pH value, the basket 2 is withdrawn from the container 1 by means a block and tackle 3.

In FIG. 2 a double-bladed agitator 5 keeps the cationic resin balls 6 in suspension in skimmed milk L contained in a container 7. When a pH meter 8 shows that the milk L has a pH value of 4.9, the milk L is removed from the container 7, leaving behind the balls 6.

The casein processing plant of FIG. 3 comprises an open-topped container 1a fitted with an agitator 2a. A pipe 3a leads from the bottom of the container and is equipped with a shut-off valve 4a.

A pipe 5a at the top of the container 1a leads from a two-way valve 6a enabling the pipe 5a to communicate with a branch pipe 7a or 8a. The other end of the branch 7a is at the bottom of a tank 9 for the cationic resin. The other end of the branch 8a is at the bottom of a tank 10 for the cationic resin.

The pipe 3a terminates above an inclined sieve 11 whose lateral wall 12 and supporting base 13 form a chamber 14 for recovering liquid milk whose pH value is, for example, 5.0. Acidulated milk is taken via a pipe 15 leading from the bottom of the chamber 14 and via a pump 16 and is delivered by means of a pipe 17 to a storage vat 18. From the bottom of this storage vat the milk can pass via a pipe 19 equipped witha valve into a basin 20 at the start of the curdling sequence. From the bottom of this basin 20 a pipe 21 leads to the top 22 of a conventional milk heating device. A pipe 23 leads from the bottom of the heater 22 to take the milk to a degassing vessel 24, from which a pipe 25 takes it to the bottom of a coagulation tube or vessel 26 which is equipped to receive (via a pipe 27) hydrochloric acid or other additives to complete the coagulation.

From the top of the coagulation tube 26, a mixture of curd and whey flows away via a pipe 28. This mixture falls onto a sieve 29 of the same construction as the sieve 11.

The solid curd drops into a dilution vat 30 whence it passes via a pipe 31 to a washing tower 32, and then via a pipe 33 to a horizontal decanter 34, before arriving via a pipe 35 at a dryer (not shown).

The whey which has passed through the sieve 29, and which is in fact a mixture of serum and fines, passes via a pipe 36 into a separator 37 for removal of the fines. The separated casein fines are taken via a pipe 38a to the bottom of the washing tower 32. The whey from which the fines have been removed leaves the separator 37 via a pipe 38 and passes, if desired after intermediate concentration in an evaporator 39, by means of a 2-way valve 40 either to the tank 9 via a pipe 41 or to the tank 10 via a pipe 42.

From the concentrator 39 a branch pipe 43 leads to the entrance of the coagulation tube 26 or to the acid supply tube 27.

The plant operates in the following manner. Skimmed milk is delivered to the container 1a, while the tank 9 is full of resin in the H+ form and the tank 10 is full of spent resin containing with metal ions. The valve 6a is closed. The container 1a and the tank 9 are made to communicate by actuating the valve 6a, so that the resin in H+ form arrives via the pipes 7a and 5a in the tank 1a, during which the agitator 2a is in operation. After a certain time has elapsed, the pH value of the milk in the container 1a reaches 5.0. The valve 4a is opened and the whole of the milk having a pH value of 5.0 and the resins in suspension therein flows via the pipe 3a on to the sieve 11. The resins are retained by this sieve and are drawn off via pump 44 and pipe 45 dividing into the branch pipe 46 and branch 47 terminating respectively at the top of the tanks 9 and 10. At this stage of operation the resins are delivered via the branch 46 to the top of the tank 9 which had been emptied of its resins in H+ form, communication between the tank 9 and the container 1a having been shut off as soon as this tank has been emptied.

The milk enters the chamber 14, passes via the pipe 15, is drawn off via the pump 16 and is taken via the pipe 17 to the vat 18, and then via the pipe 19 to the basin 20. It is then taken via the pipe 21 and heated by the device 22, degassed by the device 24 and coagulated in the coagulation tube 26. A mixture of curd and whey leaves by the pipe 28. The whey passes via the pipe 36, the separator 37 and the pipe 38 into the tank 10 which contains resin to be regenerated, the valve 40 preventing the passage of acid into the tank 9. When the resin in the tank 10 is regenerated, the setting of the valve 40 is changed, so that the acid whey is then taken to the tank 9. The tank 10 is ready to carry out the same task as the tank 9 at the start of operation.

This arrangement therefore enables acid to be saved. It has also been shown that the washing tower can in this plant have smaller dimensions for the same capacity than those which it must have in conventional casein processing plants which do not utilise cationic resins for acidulation of skimmed milk.

The following Examples illustrate the invention:

EXAMPLE 1

1 liter of skimmed milk having a pH value of 6.6 is placed in a glass beaker fitted with a magnetic stirrer and a pH meter. 10 ml of Lewatit S100 resin having a grain size of 0.4 to 0.98 mm are added progressively at 4° C., until the pH value of the milk drops to 5.0, which occurs after 2 to 3 minutes. The acidulated milk is separated from the resins and it is acidulated with dilute HCl until flocculation occurs. Preparation of casein is continued in the conventional way. The level of alkalinity of the ashes of the serum is 480 mg of $Na_2CO_3$ per gram of ash.

EXAMPLE 2

Example 1 is repeated, but at a temperature of 50° C. Lowering of the pH value to 5.0 is effected in 4 minutes.

EXAMPLE 3

Into a tank of 1,000 liters of skimmed milk stirred by an agitator turning at 5 to 6 revolutions per minute air is intermittently supplied on the surface and 50 liters of Duolite resin are introduced. The grain size is between 0.5 and 1 mm. The period required to obtain a pH value of 4.9 is 4 to 5 minutes.

I claim:

1. A process for the acidulation of milk having a starting normal pH value which comprises:
    (a) suspending and stirring particles of a cationic exchange resin in its H form in the milk until the milk has a pH value which is lower than the starting pH value, but which is still higher than that at which flocculation of the milk takes place, then
    (b) separating the particles from the milk with a sieve, and then
    (c) adding to the milk an acid solution in an amount sufficient for flocculation of the milk to take place.

2. The process of claim 1, wherein the pH value which is lower than the starting pH value but which is still higher than that at which flocculation takes place is higher than 4.7.

3. The process of claim 1 wherein the pH value which is lower than the starting pH value but which is still higher than that at which flocculation takes place is from 4.9 to 5.0.

4. The process of claim 1, wherein the milk is skimmed milk.

* * * * *